United States Patent [19]

McGehee, Sr. et al.

[11] 4,442,585
[45] Apr. 17, 1984

[54] METHOD OF CONSTRUCTION FOR THERMAL AND ACOUSTIC INSULATION BLANKETS

[76] Inventors: Fred N. McGehee, Sr.; Billy J. Peck; Clyde B. Betz; Calvin R. Morgan, Jr., all of P.O. Box 568, Harvey, La. 70058

[21] Appl. No.: 363,871

[22] Filed: Mar. 31, 1982

[51] Int. Cl.³ .............................................. B23P 11/00
[52] U.S. Cl. .................................. 29/432; 29/455 R; 138/149
[58] Field of Search ............... 29/455 R, 432, 432.2, 29/450; 138/149, 140, DIG. 4, DIG. 8

[56] References Cited

U.S. PATENT DOCUMENTS

| | | | |
|---|---|---|---|
| 2,160,009 | 5/1939 | Walker | 138/149 |
| 2,719,099 | 9/1955 | Holbrook | 138/149 |
| 3,030,250 | 4/1962 | Losse | 138/149 |
| 3,858,618 | 1/1975 | Kaufman | 138/149 |
| 3,948,295 | 4/1976 | Lemont et al. | 138/149 X |
| 4,009,735 | 3/1977 | Pinsky | 138/149 X |
| 4,104,783 | 8/1978 | Schultz et al. | 29/455 R X |
| 4,190,131 | 2/1980 | Robinson | 138/149 X |

*Primary Examiner*—Charlie T. Moon
*Attorney, Agent, or Firm*—Keaty & Keaty

[57] ABSTRACT

An improved method of construction for thermal and acoustic insulation blankets is provided wherein a ceramic fiber thermal insulation core is cut along pattern lines and a acoustically insulating thin sheet of lead is molded in conformance with the shape of the ceramic fiber core. A thin, stainless steel foil/fiberglass cloth laminate is placed along the inner most surface of the insulation core so that the laminate serves as a barrier between the insulation core and the object being insulated. A silicone-rubber coated fiberglass cloth is wrapped around the insulation core and accompanying layers of insulation, and the fiberglass cloth is stitched with stainless steel staples. The blanket is then provided with an outer jacket comprised of a flexible knitted, stainless steel wire mesh to form a stocking containing the insulation blanket. The ends of the stocking are stitched with stainless steel staples. The ends of an insulation blanket are mated along a single seam to completely insulate an entire circumferential surface of a pipe. A velcro lead lined flap along the mating edge of the seam is provided to provide greater thermal and acoustic insulation along the seam. A hook and loop arrangement is used to lace the mating ends of the blankets against one another for providing a barrier substantially impermeable to thermal and acoustic radiation.

1 Claim, 8 Drawing Figures

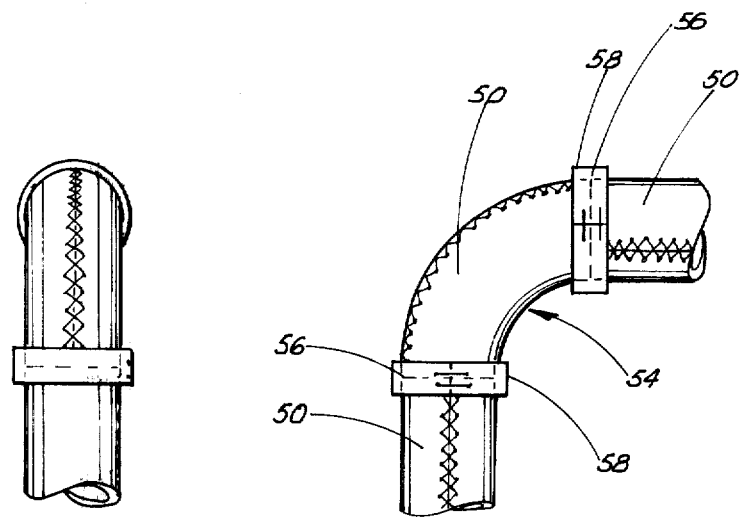
FIG. 7  FIG. 8
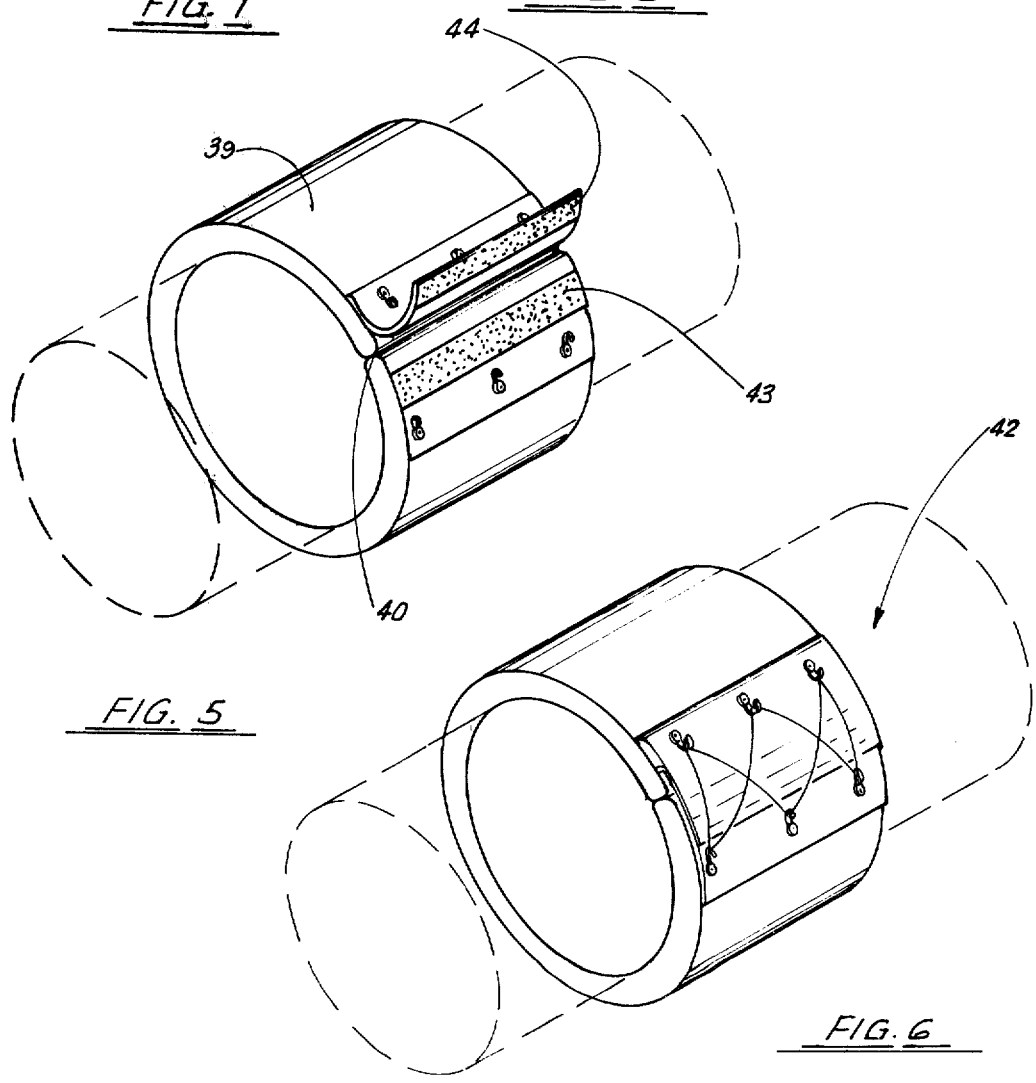
FIG. 5
FIG. 6

METHOD OF CONSTRUCTION FOR THERMAL AND ACOUSTIC INSULATION BLANKETS

BACKGROUND OF THE INVENTION

1. Field of the Invention

The present invention relates to acoustic and thermal insulation. More particularly, the present invention relates to thermal and acoustic insulation blankets for use in thermally and acoustically insulating exhaust systems in the pipeline industry, more particularly adapted to insulating compound curvatures such as turbines and turbochargers, where normally multiple blocks would be utilized in the insulating of the entire curvature surface.

2. General Background

In the early development of this invention, prototype insulation blankets consisted of a ceramic fiber core encased in a fiberglass logging fabric. Anchors, washers and stitching staples were made of galvanized steel. Since the fiberglass logging fabric was not waterproof, the prototype blankets were not installed for outdoor application without additional weather proofing. This additional weather proofing required coating the fiberglass logging cloth with a mastic weather proofing compound, usually a polyvinyl acrylic mastic. The mastic application, however, hindered removal and replacement of the blanket. Experimental runs of the prototype blanket were made utilizing an outer covering of fiberglass logging fabric laminated to aluminum foil. The foil surface was intended to act as a weatherproofing agent, however, temperature limitation and weather-related failures often resulted.

A silicone treated fiberglass cloth then became available in the late 1970's and it was immediately put into use as the water and oil resistant jacket for the prototype insulation blankets. In early 1980, a random inspection of the prototype blankets indicated that the galvanized anchors were beginning to rust in chemical plant service; therefore in early 1980, stainless steel lacing anchors and washers were used exclusively.

In an effort to upgrade the quality of the ceramic fiber core portion of the experimental blanket, a core with a higher percentage alumina silica content was utilized. This ceramic fiber was rated at 2400° F. and offered less permanent linear change about 1600° F., but there was difficulty in maintaining a consistent core thickness. Consistent thickness was finally achieved by using a ceramic fiber core having the same alumina-silica content, but only a 2300° F. rating and four pounds per cubic foot density. Additionally, in an effort to enhance the incombustible properties of the insulation blankets, a new silicone rubber treated fiberglass cloth was utilized in late 1981 and is presently utilized in the apparatus of the present invention. Finally, an effort to improve the prototype blankets led to using a 6 pounds per cubic foot 2300° F. rated ceramic fiber blanket with a higher compressive strength and lower thermal conductivity.

The apparatus of the present invention, as it is disclosed in its final preferred embodiment, has a multitude of uses in the marine, industrial and offshore industries. It can be used in the acoustic and thermal insulation of bolts, flanges, valves, elbows, tees, reducers, laterals, closures, steam turbines, gas turbines, tubrocharges, and other engine exhaust systems and high pressure gas lines. The use of these thermal insulation blankets would usually obviate the outdated methods of conventional block insulation and, as stated earlier, would be particularly useful in insulating compound curvatures. In the past these compound curvatures were insulated with one or more layers of block insulation, the finished surface then being built up with a layer of insulating finishing cement reinforced with hex mesh or steel lathe. A final cover of asbestos lagging cloth saturated with sizing adhesive would then be used to cover it. There are several patents which address the use of an insulation type of system for curvature objects, the most pertinent being as follows:

U.S. Pat. No. 3,000,433 issued to R. K. Kemper entitled "Thermal Insulation For A Pipe" which teaches the use of a method of insulating a pipe or the like with the use of a thick layer of flexible porous insulating material of low compressor strength, on the upper side of the horizontal pipe, the material being in the form of slabs or blocks. On the upper side of the pipe, there would be a loose fibrous highly efficient insulating material, there being radial spacers extending between the layers and an overall covering of metal.

U.S. Pat. No. 3,724,491 issued to Knudsen, et al entitled "Removable Valve Insulation And Cover", teaches the use of an insulating shelf or valve made up of a plurality of sections which mate together about the valve, each section having an inner and outer skin with insulation material between the skin.

U.S. Pat. No. 4,207,918 entitled "Insulation Jacket" teaches the use of an insulation jacket for use as a valve cover, with the jacket having a body portion with a central section and two lateral sections. Each of the lateral sections would comprise an inboard and outboard belt with the belts extending along each of the lateral sections. The insulation jacket is comprised of fiberglass cloth fabric coated with a silicone rubber coated so as to render it resistant to water and outside conditions.

U.S. Pat. No. 4,201,247 issued to Shannon entitled "Fibrous Product And Method And Apparatus For Producing Same" would teach the use of a fibrous product having amorphous glass fibers and mineral fibers and a method for forming or processing blends or laminations of such fibers to produce several composite fibrous end products used as fire-rated acoustical tile and ceiling board, etc.

U.S. Pat. No. 4,077,491 issued to Hankel entitled "Acoustical Composite" discloses an improved acoustical material for use as a lining material in association with noise generating machinery generally comprising two woven fiberglass layers and an intermediate nonwoven fibrous layer to form a composite which has acoustical flow resistance.

U.S. Pat. No. 3,527,258 issued to A. S. Farr entitled "Flexible Tubing" teaches a helical coil of wire with connector members secured to each end of the wire having an inner layer of insulating material and an outer vapor barrier material.

GENERAL DISCUSSION OF THE PRESENT INVENTION

The present invention solves the problems and shortcomings confronted in the present state of the art in a simple and straightforward manner. The preferred embodiment of the present invention provides an acoustic and thermal insulation blanket comprising generally a ceramic fiber core of approximately one-half to one and one-half inches in thickness. Completely encasing the ceramic fiber core is a silicone-rubber coated fiberglass cloth. Seams in the silicon-rubber coated fiberglass cloth are mated and stitched with stainless steel staples. A section of 1/64 inch thin lead sheet may optionally be placed between the object to be insulated and the insulation material itself for additional noise insulation. In instances where pipe or valve leakage presents contamination problems, a section of thin stainless steel foil/fiberglass cloth laminate is placed between the insulated conduit and the fiber insulation core. The insulation core and stainless steel and/or lead layers are wrapped with a silicone-rubber coated fiberglass cloth jacket to contain the aforementioned thermal and acoustic insulation layers as desired. A flexible stainless steel mesh blanket encloses and contains these layers, providing additional protection for the blanket.

If the object being insulated is round, a series of draw wires are laced through stainless steel staples secured to the cloth jacket. The draw wires extend out 6 inches from each longitudinal edge of the blanket, and are used to assure a tight fit around a round object being insulated.

The blanket is also fitted with stainless steel lacing anchors, spaced 3 to 4 inches apart along the longitudinal edges. The anchors are secured by placement of a stainless steel self-locking washer over the spindle. The spindle is bent over and down 180° to provide a hook and loop fastening system for secure closure of the blanket when in use. In some embodiments, a velcro flap or the like is used at the point of lacing in order to more fully protect the mating line. A sheet of soft lead or the like can be contained within the velcro flap for additional insulation.

Therefore, it is an object of the present invention to provide a system for insulating exhaust systems or the like.

It is a further object of the present invention to provide a system for acoustically and thermally insulating exhaust systems, particularly systems with curvature flow through exhaust outlets.

It is still a further object of the present invention to provide a method and apparatus for insulating exhaust pipes, high pressure gas lines, turbal charges and the like.

It is a further object of the present invention to provide an apparatus for insulating either acoustically, thermally, or both, exhaust systems such as pipes or the like in a gas transfer plant, oil rig, refinery or the like.

In order to accomplish the above objects, it is a feature of the present invention to provide a ceramic fiber thermal insulation core housed in a silicon-rubber coated fiberglass cloth in order to thermally insulate pipe or the like.

It is a further feature of the present invention to provide the feature described in the paragraph above, including a thin layer of lead adjacent the underside of the ceramic fiber insulation core, in order to achieve superior acoustic insulation of the pipe.

It is still a further feature of the present invention to provide a ceramic fiber thermal insulation core wrapped in a silicone-rubber coated fiberglass cloth, having additionally a layer of stainless steel foil/fiberglass cloth laminate between the underside of the fiber core and the object to be insulated in order to help prevent contamination of the insulation and the outer surroundings.

It is still a further feature of the present invention to provide a flexible fiber insulation system which envelopes a longitudinal pipe or the like, having means for lacing the ends of the insulation in order to achieve a single mating surface for better insulation.

It is still a further feature of the present invention to provide a wire mesh "stocking" or the like for enveloping the insulation core, and lead liner, and stainless steel/foil liner, in order to achieve a single means for insulating a pipe or the like in the system.

It is still a further feature of the present invention to provide a flat means at the mating ends of the insulation surface in order to achieve more complete insulation of the object to be insulated.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIGS. 5 and 6 are views of the means for mating and insulating the mating surface of a layer of the apparatus of the present invention.

FIGS. 7 and 8 are front and side views respectively of the insulating material as applied to an elbow joint or the like in the system of the present invention.

DETAILED DESCRIPTION OF THE PREFERRED EMBODIMENT

Figure 2:
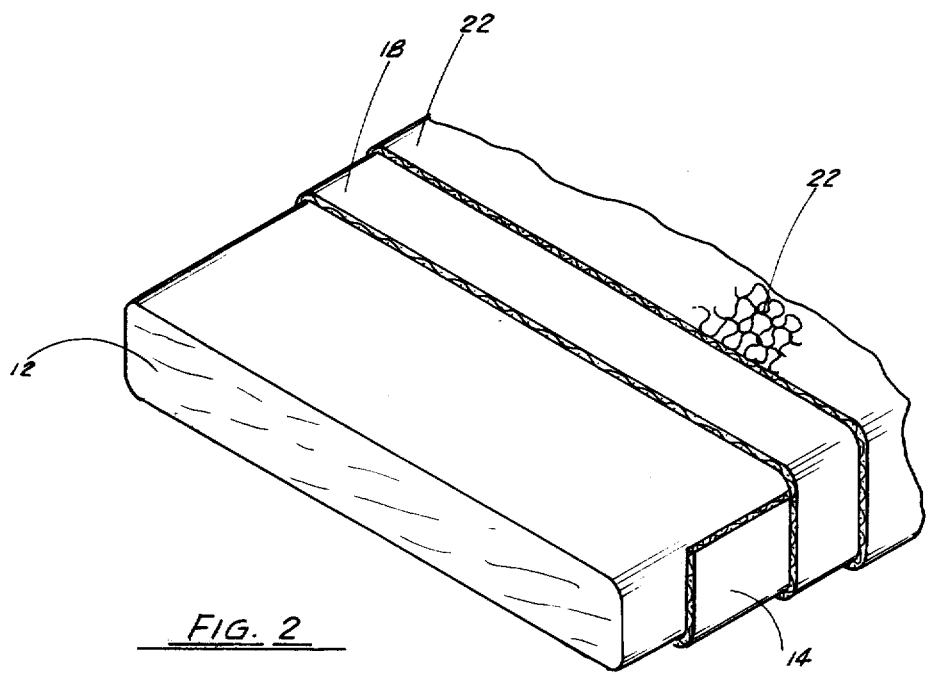
FIG. 2 is a perspective bottom view of the preferred embodiment, parts thereof being cut away for clarity.
Figure 1:
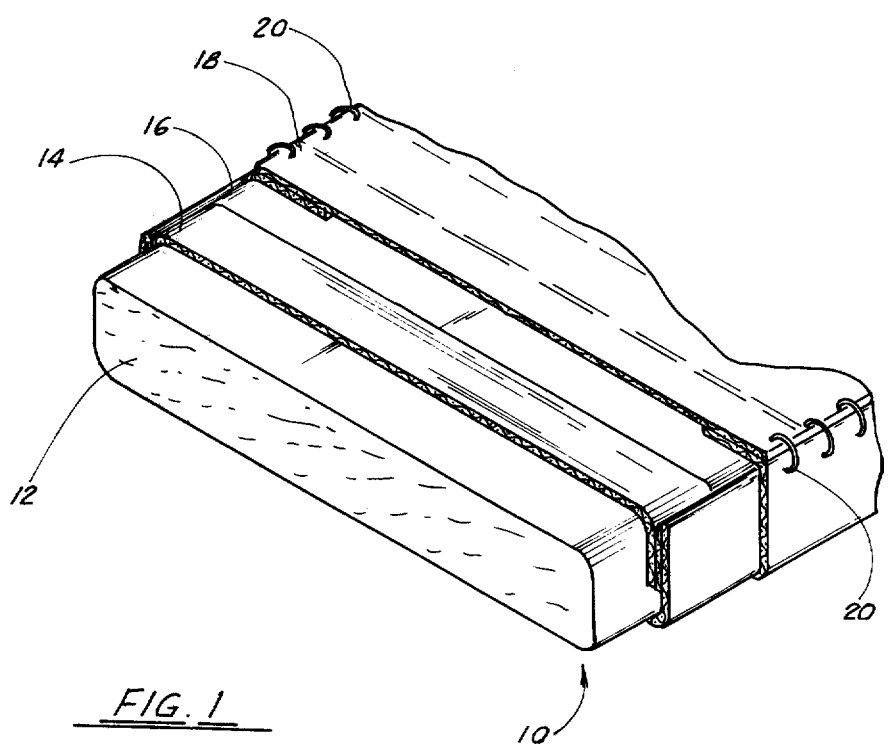
FIG. 1 is a perspective top view of the preferred embodiment of the acoustic and thermal insulating apparatus of the present invention, parts thereof being cut away for clarity.

Referring now more particularly to FIGS. 1 and 2 of the drawings, there is shown therein an acoustic and thermal insulation blanket, generally indicated as 10, which embodies the principles of the present invention. The blanket 10 includes an insulation core 12 preferably having an alumina silica content on the order of 99.8%. Core 12 also has a density on the order of 6 pounds per cubic foot, and a 2300° F. heat capability. The core also has a high compressive strength and low thermal conductivity.

As also seen in FIGS. 1 and 2, an acoustic insulation means comprised of a thin lead sheet 14 is disposed parallel to core 12. Sheet 14 is very malleable and can be shaped to fit the configuration of core 12.

A layer of stainless steel foil/fiberglass cloth 16 covers sheet 14 on the side of the blanket which is to be placed adjacent the valve or pipe 54 (FIG. 8) being insulated. Cloth 16 is impermeable to contaminants leaking out of valves or pipes, thereby preventing leakage into core 12.

Flexible silicone and rubber coated fiberglass cloth jacket 18 surrounds and encloses core 12, sheet 14 and cloth 16. Stainless steel staples 20 (see FIG. 1) are used to stitch the seams of jacket 18 together.

Jacket 18 is further enveloped by flexible knitted, stainless steel wire mesh stocking 22. Stocking ends are clipped, folded and stitched with stainless steel staples (not shown) similar to staples 20 used in closing the seams of jacket 18.

Figure 3:
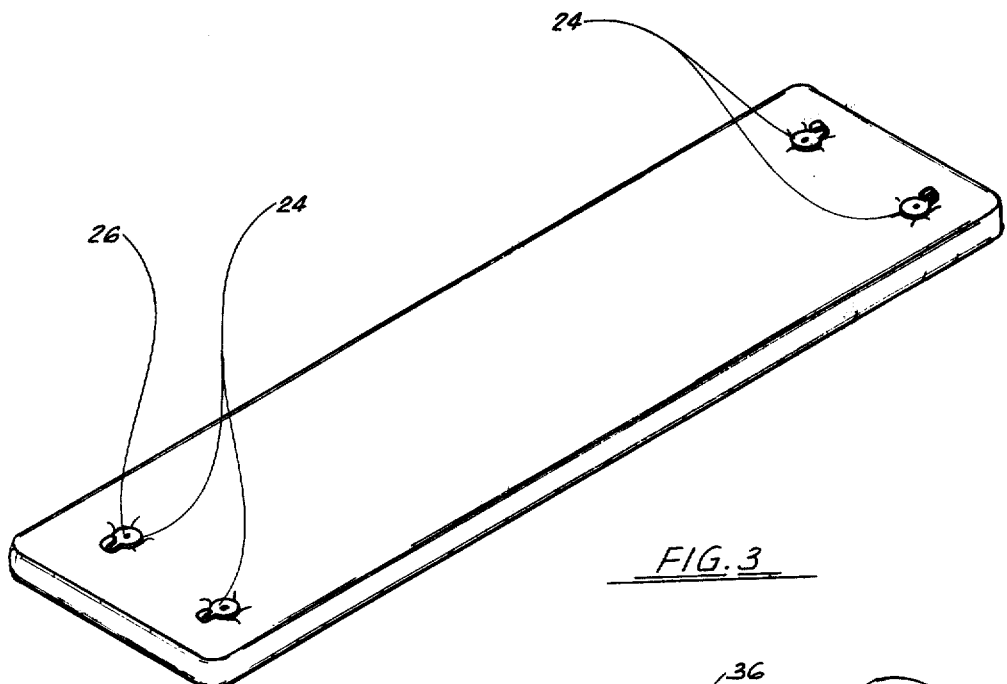
FIG. 3 is a perspective view of a completed layer of the preferred embodiment of the apparatus of the present invention.
Figure 4:
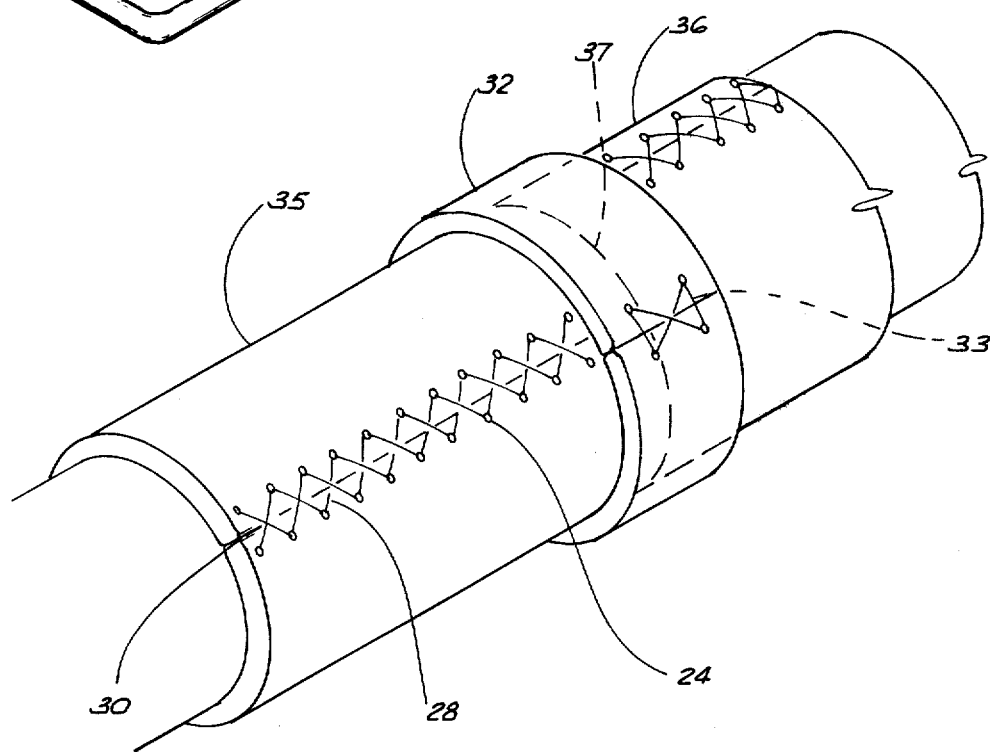
FIG. 4 is a view of the insulation as mounted on a pipe or the like in the apparatus of the present invention.

Stainless steel lacing anchors (best seen in FIG. 3) are composed of a spindle 24 embedded in blanket 10 along the edges of the blanket 10 which mate to form mating edge 30 when the blanket is wrapped around a valve or pipe (see FIG. 4). Spindle 24 is held in place with a locking washer 26, and the outward projection of spindle 24 is bent to form a hook on the side of the blanket opposite from the valve or pipe engaging side. Laces 28 are looped around the hoops of spindles 24, thereby holding mating edges of blanket 10 in juxtaposed relationship, and forming a tight seam that is substantially impermeable to thermal and acoustic radiation.

When a plurality of blankets such as sections 35 and 36 are wrapped around a valve or pipe, a joint 37 is formed between Sections 35, 36. Second insulation layer 32 is accordingly situated in overlapping relationship to joint 37 to prevent escape of thermal and acoustic radiation from joint 37. A system of spindles and laces 33, similar to spindle 24 and laces 28 on blankets 10 as described above, is used on layer 32 to maintain a snug fit of layer 32 about joint 37.

If the object being insulated is round shaped, 16 gauge stainless steel wires (not shown) are inserted along the length of the blanket between core 12 and jacket 18. This wire is secured to cloth 18 with stainless steel staples 20. The wires form draw lines extending preferably 6 inches from each mating edge of blanket 10. Tightening of these draw wires assure a tight fit of blanket 10 around a round object being insulated.

An additional embodiment of the blanket is shown in FIGS. 5 and 6, wherein section 39 is disposed around a pipe being insulated. Female velcro flap 43 and male velcro flap 44 are ridgly secured to the mating ends of section 39 in such fashion that when section 39 is disposed in insulatingly covering relationship to the pipe, flaps 43, 44 can engage and overlap seam 40. These flaps thereby render seam 40 significantly impermeable to thermal and acoustic radiation that would otherwise escape along seam 40. Flaps 43, 44 can also be lined with lead, or other insulation material, to provide even greater insulation. Flaps 43, 44 are secured and held shut with a lacing 42 similar to the hook and loop arrangement described above.

Turning now to FIGS. 7 and 8, sections of insulation 50 are shown wrapped in insulating relationship around elbow joint 54. Mating edges 56 are further insulated with insulating collars 58.

In operation, the aforementioned thermal and acoustic insulation blanket (see FIG. 3) is manufactured to a pre-cut length equal to the circumference of the pipe or valve being insulated. As best seen in FIG. 4, adjacent sections 35, 36 are wrapped around the pipe, and join together along mating edge 30. Spindles 24 receive loops 28 thereabout along the length of edge 30 in order to hold the mating edges of blanket 10 in juxtaposed relationship such that the seam formed by the mating edges is significantly impermeable to thermal and acoustic radiation.

As can also be seen in FIG. 4, layer 32 is wrapped around the joint 37 formed between sections 35 and 36. Laces are then wrapped around hooked spindles at 33 to hold the mating edges of layer 32 in close juxtaposed relationship. The overall effect of adding layer 32 is to prevent the escape of thermal and acoustic radiation through joint 37.

In the other preferred embodiment of the invention shown in FIGS. 5 and 6, the leakage of thermal and acoustic radiation from seam 40 is being prevented by the interengaged and laced flaps 43, 44 which are mated in overlapping relationship to seam 40.

FIGS. 7 and 8 are intended to illustrate how a series of blanket sections 50 can be placed around an elbow joint 54, forming a plurality of joints 56 between sections 50. A plurality of second layers 58 are additionally secured around each joint 56 to enhance the thermal and acoustic insulation abilities of the invention described herein.

What is claimed as invention is:

1. A method of constructing thermal and acoustic insulation blankets, which comprises the following steps:
   a. providing a ceramic fiber thermal insulation core, said core being substantially the basic shape of the object to be insulated; cutting said insulation core material along pattern lines with a cutter means;
   b. providing noise abatement means, said noise abatement means comprising a thin sheet of lead, substantially in the shape of said insulation core means;
   c. enveloping said insulation core with said lead sheet to provide substantially the same shape as said insulation core; further providing a contamination insulation means, wherein said means comprises a thin stainless steel foil/fiberglass cloth laminate;
   d. placing said stainless steel laminate along the innermost surface of said insulation core, so that said laminate serves as a barrier between said insulation core and the object to be insulated;
   e. enveloping said insulation core blanket with a silicone-rubber coated fiberglass cloth;
   f. stitching the seams of said cloth around said inner core insulation means with stainless steel staple means;
   g. providing an outer jacket of a flexible knitted stainless steel wire mesh means, said wire mesh means forming a "stocking" containing the insulation blanket;
   h. stitching the ends of said stocking with said stainless steel staples;
   i. wrapping the object to be insulated in said insulation blanket;
   j. mating the ends of said insulation blanket along a single seam so that an entire circumferential surface of said pipe to be insulated is completely insulated;
   k. providing a secondary insulation means, which comprises a velcro lead-lined flap along said mating edge of said insulation section; and
   l. lacing the ends of said insulation section against one another for providing a barrier substantially impermeable to thermal and acoustic radiation.

* * * * *